United States Patent
Celani et al.

(10) Patent No.: US 10,351,779 B2
(45) Date of Patent: Jul. 16, 2019

(54) CATALYST PRECURSOR, METHOD OF PREPARATION AND USE THEREOF

(71) Applicant: JOHNSON MATTHEY PUBLIC LIMITED COMPANY, London (GB)

(72) Inventors: Andrea Celani, Billingham (GB); Laura Helen Davies, Billingham (GB); Elizabeth Margaret Holt, Billingham (GB); Gordon James Kelly, Billingham (GB)

(73) Assignee: Johnson Matthey Public Limited Company, London, England (GB)

( * ) Notice: Subject to any disclaimer, the term of this patent is extended or adjusted under 35 U.S.C. 154(b) by 0 days.

(21) Appl. No.: 15/561,809

(22) PCT Filed: Mar. 15, 2016

(86) PCT No.: PCT/GB2016/050696
§ 371 (c)(1),
(2) Date: Sep. 26, 2017

(87) PCT Pub. No.: WO2016/156789
PCT Pub. Date: Oct. 6, 2016

(65) Prior Publication Data
US 2018/0119021 A1    May 3, 2018

(30) Foreign Application Priority Data
Mar. 31, 2015 (GB) .................................. 1505556.9

(51) Int. Cl.
| | | |
|---|---|---|
| *B01J 23/75* | (2006.01) | |
| *B01J 35/02* | (2006.01) | |
| *B01J 35/04* | (2006.01) | |
| *B01J 37/02* | (2006.01) | |
| *C10G 2/00* | (2006.01) | |
| *C04B 35/46* | (2006.01) | |
| *B01D 39/20* | (2006.01) | |
| *C04B 38/00* | (2006.01) | |
| *B01J 21/06* | (2006.01) | |
| *B01J 35/00* | (2006.01) | |
| *C04B 111/00* | (2006.01) | |

(52) U.S. Cl.
CPC ......... *C10G 2/332* (2013.01); *B01D 39/2093* (2013.01); *B01J 21/063* (2013.01); *B01J 23/75* (2013.01); *B01J 35/0053* (2013.01); *B01J 35/023* (2013.01); *B01J 35/04* (2013.01); *B01J 37/0201* (2013.01); *C04B 35/46* (2013.01); *C04B 38/00* (2013.01); *C04B 38/0061* (2013.01); *C04B 2111/0081* (2013.01); *C04B 2235/3275* (2013.01); *C04B 2235/616* (2013.01); *C04B 2235/658* (2013.01)

(58) Field of Classification Search
CPC ...... B01J 23/75; B01J 21/063; B01J 35/0053; C04B 35/46; C04B 38/0061; C04B 2235/3275; C04B 2235/3277
See application file for complete search history.

(56) References Cited

U.S. PATENT DOCUMENTS

| | | | | |
|---|---|---|---|---|
| 3,293,094 A | * | 12/1966 | Nairn ...................... | C08J 9/101 156/79 |
| 5,195,843 A | * | 3/1993 | George .................. | C04B 38/00 405/63 |
| 5,217,939 A | | 6/1993 | Campbell | |
| 6,558,634 B1 | | 5/2003 | Wang et al. | |
| 6,750,258 B2 | | 6/2004 | Wang et al. | |
| 2003/0149120 A1 | * | 8/2003 | Wang ..................... | B01J 8/0285 518/715 |
| 2003/0185721 A1 | * | 10/2003 | Wang ..................... | B01J 8/0285 422/177 |
| 2004/0058810 A1 | * | 3/2004 | Baumann ............... | B01J 23/894 502/304 |
| 2005/0207928 A1 | * | 9/2005 | Shimizu ................ | B22F 3/1125 419/2 |
| 2009/0325780 A1 | * | 12/2009 | Gauckler .............. | A61L 27/105 501/84 |
| 2012/0329889 A1 | | 12/2012 | Yang et al. | |
| 2013/0164494 A1 | | 6/2013 | Estenfelder et al. | |
| 2013/0217793 A1 | * | 8/2013 | Wang ..................... | B01J 23/75 518/717 |
| 2016/0208175 A1 | * | 7/2016 | Groppi ................... | B01J 8/067 |

FOREIGN PATENT DOCUMENTS

| | | | |
|---|---|---|---|
| CN | 102728359 A | 10/2012 | |
| CN | 103721759 A | 4/2014 | |
| DE | 3732653 A1 | 4/1989 | |
| EP | 2141139 A1 * | 1/2010 | .......... B01J 35/0006 |
| WO | WO 2007/093825 A1 * | 8/2007 | |
| WO | WO2015033266 A1 | 3/2015 | |

OTHER PUBLICATIONS

Russak M.A. et al., "Development and Characterization of a Closed Pore Insulation Material," American Ceramic Society Bulletin, American Ceramic Society, vol. 55, No. 5, May 1, 1976, pp. 504-507.
Yuefeng Liu et al., "Fischer-Tropsch Reaction on a Thermally Conductive and Reusable Silicon Carbide Support," Chemsuschem, vol. 7, No. 5, May 25, 2014, pp. 1218-1239.
Yu Liu et al., "High Performance Structured Platelet Milli-Reactor Filled With Supported Cobalt Open Cell SiC Foam Catalyst for the Fischer-Tropsch Synthesis," Chemical Engineering Journal, vol. 222, Apr. 1, 2013, pp. 265-273.
Carlo Giorgio Viscopnti et al., "Monolithic Catalysts With High Thermal Conductivity for the FischerTropsch Synthesis in Tubular Reactors," Chemical Engineering Journal, vol. 171, No. 3, May 4, 2011, pp. 1294-1307.
Martyn V. Twigg et al., "Fundamentals and Applications of Structured Ceramic Foam Catalysts," Industrial & Engineering Chemistry Research, vol. 46, No. 12, Jun. 1, 2007, pp. 4166-4177.
GB1505556.9, UK Search Report Under Section 17(5) dated Oct. 29, 2015.
PCT/GB2016/050696, International Search Report dated Aug. 26, 2016.

* cited by examiner

*Primary Examiner* — Jun Li
(74) *Attorney, Agent, or Firm* — BakerHostetler

(57) ABSTRACT

A catalyst precursor suitable for the Fischer Tropsch reaction is described comprising cobalt oxide supported on a porous support wherein the porous support is a ceramic foam comprising a closed cell structure.

15 Claims, No Drawings

CATALYST PRECURSOR, METHOD OF PREPARATION AND USE THEREOF

CROSS-REFERENCE TO RELATED APPLICATIONS

This application is the National Stage of International Patent Application No. PCT/GB2016/050696 filed Mar. 15, 2016, which claims priority from Great Britain Patent Application No. 1505556.9 filed Mar. 31, 2015, the disclosures of each of which are incorporated herein by reference in their entirety.

The present invention relates to cobalt based Fischer-Tropsch catalysts, in particular cobalt based Fischer-Tropsch catalysts on foamed supports.

The Fischer-Tropsch reaction uses synthesis gas comprising carbon monoxide and hydrogen to generate hydrocarbons, particularly long-chain hydrocarbon products and oxygenates. Suitable catalysts comprise cobalt supported on a metal oxide support. The cobalt is typically provided in oxidic form and reduced in-situ to the active metal form or the catalyst may be pre-reduced and passivated. The metal oxide support may be in the form of a spray-dried powder, granules or shaped extrudates.

U.S. Pat. Nos. 6,558,634 and 6,750,258 disclose a microchannel reactor for the Fischer-Tropsch reaction in which a preferred catalyst structure within the microchannels is made using a metal foam support with an open cell structure to permit the flow of gas though the catalyst. The metal foam structure was coated with a slurry of a Fischer-Tropsch catalyst and dried to form the catalyst structure. Metal foam supports are however of limited utility and it is necessary to pre-treat the metal to ensure the necessary adhesion of the catalyst slurry.

CN102728359(A) discloses a cobalt-based Fischer-Tropsch catalyst prepared using a mesoporous silicon oxide foam as carrier. The mesoporous carrier has a three-dimensional ordered pore structure having a pore size in a range of 20 to 50 nm and a pore volume of 1.5 to 3.0 cm$^3$/g. The foam has an open cell structure wherein the spherical pores are communicated through windows.

U.S. Pat. No. 5,217,939 discloses a cobalt oxide-coated ceramic foam, where the ceramic foam is a reticulated ceramic foam, made for example by polyurethane casting. Such foams possess an open cell structure.

We have found that surprisingly effective cobalt based Fischer Tropsch catalysts may be supported on a ceramic foam support comprising a closed cell structure.

Accordingly the invention provides a catalyst precursor suitable for the Fischer Tropsch reaction comprising cobalt oxide supported on a porous support wherein the porous support is a ceramic foam comprising a closed cell structure.

The invention further provides a catalyst produced from the catalyst precursor, methods for the manufacture of the catalyst and catalyst precursor, and the use of the catalyst in a Fischer-Tropsch process.

The cobalt oxide in the catalyst precursor may be $Co_3O_4$ and/or CoO, although $Co_3O_4$ is more suitable. The cobalt oxide may be present on the porous catalyst support as crystallite, with an average crystallite size in the range 5-25 nm.

The cobalt content of the catalyst precursor, expressed as Co, may be in the range 5-50% by weight, preferably 10-40% by weight, more preferably 10-30% by weight.

The catalyst precursor may further comprise one or more promoter metals or metal compounds to enhance the activity or selectivity of the catalyst and/or to enhance the reduction of the cobalt oxide to cobalt metal. Suitable promoter metals include one or more of Pt, Pd, Ru and Re. The promoter metal may be included in the catalyst precursor in an amount in the range 0.01-1.0%, preferably 0.01 to 0.50% by weight.

A ceramic foam is a solid porous material generally having many gas-filled cells or voids formed therein, such that the support has a lower density than conventional catalyst supports. Open cell ceramic foams may be manufactured by impregnating open-cell polymer foams internally with a ceramic slurry and then firing in a kiln, leaving only a ceramic material. In the present invention the ceramic foam comprises a closed cell structure and is therefore prepared by different methods. By the term, "closed cell structure", we mean that the cells or voids within the foam are generally not inter-connected, although a small proportion, e.g. up to about 20% of the cell volume, but preferably less than 10% of the cell volume, may be interconnected. In a closed cell structure, unlike an open-cell structure, there is generally no open flow-path through the foam from one side to another such that a gas passing though the foam has to diffuse through a cell wall from one cell to the next. The shape of the cells in the closed cell structure will vary depending upon the manufacturing method and conditions, but typically are spheres or distorted spheres having a circular cross section. The cells may have a diameter in the range 0.1-500 µm, although the majority (i.e. >50% in number) of the cells desirably have a diameter in the range 0.1-250 µm. The average cell diameter may be in the range 0.2-150 µm, preferably 1-100 µm. The cell diameters may be determined using microscopy.

The void fraction of the foams may be in the range 50-95% by volume, preferably 75-90% by volume. Hence the solids content of the foams may be 5-50%, preferably 10-25% by volume.

Because the support has a closed cell structure, there are walls between the cells. The cell walls are porous, i.e. the cell walls may comprise pores through which a gas may pass. The pore size or width may be >50 nm in diameter although preferably the pores are ≤50 nm in diameter. Cobalt oxide is present on the cell walls and in at least a portion of the pores in the cell walls, which upon activation, is able to catalyse the Fischer-Tropsch reaction. Fischer-Tropsch reactions are influenced by the contact time of the reacting gases and therefore the thickness of the cell walls may be controlled to provide an optimum diffusion path for reacting gases through the catalyst in order to maximise selectivity. The thickness of the cell walls may also be controlled to impart a desired strength to the final catalyst. Cell wall thicknesses may be up to 500 µm, preferably up to 200 µm, with an average in the range 10-100 µm, preferably 25-85 µm. The control of wall thickness may, for example, be performed by controlling the void fraction in the ceramic foam during its manufacture.

The ceramic in the ceramic foam may be formed using a metal oxide or other ceramic material suitable for supporting a Fischer-Tropsch catalyst, such as SiC. Metal oxides are preferred and suitable metal oxide foams may be prepared using alumina, metal-aluminates, silica, ceria, titania, zirconia and mixtures of these. Silica is less preferred. Alumina can form cobalt-aluminate by reaction with cobalt compounds used to produce the cobalt oxide. Cobalt aluminate is less reducible than cobalt oxide, and so where alumina is present in the catalyst support it is preferably coated with a layer of another metal oxide, such as silica, titania or zirconia, or the alumina may be converted into another metal aluminate by reaction with a suitable divalent metal, such as Ni. Titania is particularly preferred because of its low interaction with cobalt and its ability for being formed into foamed structures. The titania may comprise variable amounts of rutile and anatase. High anatase materials are preferred, e.g. with an anatase content >60% by weight.

The invention further provides a method for preparing a catalyst precursor comprising the steps of (i) forming a ceramic foam comprising a closed cell structure, (ii) applying a cobalt compound to the ceramic foam and (iii) heating the cobalt-containing ceramic foam to form the catalyst precursor.

Various known methods may be used to form the ceramic foam comprising a closed cell structure. For example, a sacrificial template method may be used wherein a ceramic precursor in liquid form is mixed with a sacrificial template material, often another liquid, and the resulting composition heated to decompose the sacrificial material and create voids in the final ceramic foam. A preferred method for preparing the ceramic foam is a direct foaming method, in which a liquid ceramic precursor or suspension of a ceramic powder in a suitable liquid is foamed by addition of a gas to create a wet foam, which is subsequently heated to give the final ceramic foam. A particularly preferred method includes (i) forming a suspension of a ceramic powder in a liquid (ii) adding a gas to the liquid to create a wet foam, and (iii) heating the wet foam to form the ceramic foam. The suspension may contain one or more surfactant-type molecules, which may be termed "amphiphiles" that act with the ceramic powder to stabilise the wet foam. Thus preferably a stabilised wet foam may be prepared using a suspension of a ceramic powder containing an amphiphile. Methods for producing such particle-stabilised foams are known.

EP1960097-A1 describes a method to prepare wet foams exhibiting long-term stability wherein partially lyophobized colloidal particles are used to stabilize the gas-liquid interface. In one aspect, the particles are partially lyophobized in-situ by treating initially hydrophilic particles with amphiphilic molecules of specific solubility in the liquid phase of the suspension. This method has been found to be particularly useful for preparing catalyst precursors according to the present invention.

Thus a suitable method for preparing a ceramic foam support may include steps where:
1. A ceramic powder is suspended in an aqueous phase;
2. An amphiphile is included in the suspension. This adsorbs at the particles surfaces forming modified particles that are less hydrophilic.
3. Air or another gas is then included into the suspension forming bubbles and causing attachment of the modified particles at the gas/aqueous phase interface in the wet foam, thereby stabilising the wet foam, and,
4. The wet foam is further processed, e.g. by shaping, drying and/or calcination.

Powdered forms of the ceramic support materials listed above may therefore be used to prepare the wet foams. The mean particle size of the ceramic particles in the suspension may be in the range 1 nm to 20 μm, but is preferably in the range 2 nm-10 μm, more preferably 2 nm-2 μm. Where ceramic powders with larger mean particle sizes are used, preferably the suspension is subjected to milling to attain the desired mean particle size in these ranges. Good foams can be obtained with narrow as well as with broad particle size distributions. Ceramic powders that have been subjected to pre-treatment with a surface modifier may be used, including ceramic powders that have been pre-treated with an amphiphile.

The stabilizing colloidal particles of ceramic are initially hydrophilic and are partially hydrophobized, preferably in-situ, by the adsorption of amphiphilic molecules on the particle surface.

The amphiphilic molecules consist of a tail part coupled to a head group. The tail part may generally be described as non-polar and can be aliphatic (linear alkyl or cycloalkyl) or aromatic (phenyl or naphthyl) and can carry one or more substituents. Such substituents may be an alkyl group, e.g. —$C_nH_{2n+1}$ with n<8, an aryl group (such as phenyl or substituted phenyl), —OH, or —$NH_2$. Preferred tail parts are optionally substituted linear carbon chains comprising 2 to 8 carbon atoms. The head group that is coupled to the tail part is preferably an ionic or polar group and may be selected from phosphates, phosphonates, phosphinates, sulphates, sulphonates, carboxylates (i.e. COOH), carboxylate esters, gallate esters, amides, amines including cyclic amines, and —OH. For Fischer-Tropsch catalysts carboxylic acids and esters are preferred to head groups that introduce sulphur or phosphorus.

Particularly preferred amphiphiles are C2-C6 carboxylic acids and esters thereof, such as valeric acid, butyric acid and propionic acid, and C2-C6 gallate esters such as propyl gallate. Furthermore we have found that particularly stable foams may be prepared using amino-acids, especially alpha-amino acids, where the amine group is attached to a carbon atom adjacent the carboxylate head group. Preferred alpha-amino acids include one or more of valine, isoleucine, leucine, phenyl alanine and tryptophan. Methionine may be used where the sulphur content of the resulting foam can be tolerated. Less preferred alpha-amino acids include alanine and tyrosine. Particularly preferred alpha-amino acid amphiphiles include one or more of leucine, isoleucine and phenylalanine. D, L or DL forms of each may be used. An especially suitable amino acid is phenyl alanine. DL-phenyl alanine may be used. Using amino acid amphiphiles has the advantage of producing stable foams with small bubbles without the handling difficulties of the carboxylic acids or problems caused by the acidic pH of carboxylic acids.

The pH of the suspension may be adjusted before the amphiphile is included, although may not be necessary. For example, the pH may be adjusted to a pH at which the surface charge of the ceramic powder is high enough for electrostatic stabilization. An acid, such as nitric acid, or a base may be added, but pH adjustment with alkali metals is not desirable for Fischer-Tropsch catalysts as alkali metals reduce the catalyst activity.

Dependent on the charge of the surface to be coated either a negatively charged or positively charged head group may be chosen. For e.g. $Al_2O_3$, a negatively charged head group is suitable at low pH conditions, i.e. pH lower than the isoelectric point, here pH<9, in particular pH 4-5. The above mentioned head groups and further similar groups can be used to modify a broad variety of ceramic particles, in particular metal oxides.

Surface modification can be achieved through the physical or chemical adsorption of negatively or positively charged amphiphile molecules onto a suitable, preferably an oppositely charged surface leaving the hydrophobic tail in contact with the aqueous phase. For e.g. positively-charged alumina particles the adsorption may be carried out with carboxylic acids in water at pH 4.75. By changing the anchoring polar head group of the amphiphile, the alumina surface can also be modified at alkaline pH conditions using for instance alkyl gallates as adsorbing molecule. This amphiphile can also be used to lyophobize the surface of a variety of other amphoteric and basic oxides. Alternatively, the surface of acidic-like oxides such as silica, silicon carbide and silicon nitride can be lyophobized employing amine-containing head group amphiphiles.

For the in-situ lyophobization of particles, the amphiphile may be applied in amounts of less than 1% by weight of the particles, preferably in amounts of <0.8% by weight. The minimum amount of amphiphile that should be present may be about 0.001%, preferably about 0.1%. Amounts in the range 0.2-1.0 mmol amphiphile/g particles may be used. Since the amphiphile, besides of other ingredients of the suspension, also influences the viscosity of the foam, the actual amount of modifier used is chosen dependent on the desired final viscosity.

It has been found that ceramic particles with different shapes can be used as foam stabilizers, i.e. the ceramic particles may be spherical, polygonal plates, needles, fibres, rods, single crystals etc., provided that their particle size is within suitable dimensions. The particles themselves may be dense, i.e. non-porous, or porous, or mixtures of dense and porous particles may be used.

The particles are preferably present in amounts of at least about 5% v/v in the suspension. The upper limit is provided by the viscosity that must not be too high. In general said viscosity should not exceed 10 Pa·s at a shear rate of $100\ s^{-1}$. The minimum amount needed to foam the whole suspension depends on the particle size and can easily be determined by the skilled person. In general the smaller the particles are, the lower the amount of particles to produce the stabilised wet foam will be. In the present invention, the solids concentration of the suspension is preferably in the range 10-45% by weight, preferably 25-35% by weight.

The wet foams are suitably formed at temperatures up to 90° C. The lower temperature is limited by freezing of the aqueous phase. The method appears to perform best where it is operated below the Krafft temperature for the amphiphile in question. The Krafft temperature (also known as Krafft point, or critical micelle temperature) is the minimum temperature at which surfactants form micelles. Below the Krafft temperature, there is no value for the critical micelle concentration (CMC), i.e., micelles cannot form.

The wet foam can be prepared using different methods, for example by incorporating bubbles of gas into the suspension. The incorporated bubbles may be small bubbles, or they may be big bubbles that upon shearing of the suspension are divided into the desired amount of small bubbles.

The air or another gas such as nitrogen, oxygen, argon and carbon dioxide, may be introduced to the suspension to generate the wet foam by any suitable means. For example foams may be produced by subjecting the suspension to a high intensity and/or high speed agitation while exposed to the atmosphere. The agitation maybe carried out using a mixer, e.g. a mechanical mixer rotated at high speed. The agitation is carried out for a sufficient period to introduce bubbles of air into the suspension until expansion has been achieved according to the desired physical and other properties of the end product. The expansion ratio, i.e. the volume of foam formed compared to the volume of the starting suspension, can be between about 1.5 and about 15. Hence dip tubes or sparger apparatus may be used. In one embodiment, a gas-inducing impeller may be used. A gas-inducing impeller introduces gas bubbles from the blades of the impeller as it rotates within the suspension. Gas-inducing impellers are known, but do not appear previously to have been used for producing ceramic foam materials. Alternatively, the gas may be introduced by bubbling it through a filter of a defined pore size into the suspension while being stirred. In this case the final pore size of the foam may be dependent on the pore size of the filter. In a variation, high pressure gas is forced through a fine filter, then intimately mixed with the suspension in a suitable chamber and the aerated mixture is then ejected from a nozzle. Alternatively an aerosol method may be used, in which the suspension is placed in a pressurised vessel and gas such as air or carbon dioxide is injected under pressure into the suspension to produce a foam when the pressure is released, e.g. via a nozzle.

Bubbles may also be formed in the suspension by including a gas-forming reagent in the suspension and activating it by heat or chemical reaction to evolve a gas. Such gas forming reagents include sodium azide and hydrogen peroxide.

The formation of bubbles in the suspension may be accomplished in a batch-wise manner or continuously.

The aqueous phase comprises water, e.g. mains water or demineralised water, which may further comprise a hydrophilic solvent such as alcohols, glycols, etc. and mixtures thereof. Further additives, such as acids or bases can be added e.g. to adjust the pH and/or the ionic strength.

As already mentioned above, the preferred pH or pH range is dependent on the head group used for in-situ lyophobization and the particle surface to be modified. It should be such that at least about 1.5%, preferably at least about 10%, much preferred about 50% of the head groups are negatively charged (deprotonated) or positively charged (protonated).

The ionic strength can be adjusted to favour the close-packing of the attached particles at the interface and the attraction of particles within the foam lamella. However, the ionic strength should be kept low enough to ensure a sufficiently low viscosity of the suspension exists to allow sufficient introduction of air or good foaming.

The viscosity of the suspension preferably is such that the viscosity is less than the level at which the introduction of gas cannot take place and above the level at which entrapped gas bubbles will tend to escape. In the absence of amphiphile addition, the viscosity may be 5 mPas to 1000 mPas at a shear rate of $100\ s^{-1}$. The viscosity of the suspension when the amphiphile is present may be in the range of about 5 mPas to about 10,000 mPa·s at a shear rate of $100\ s^{-1}$, preferably 25 mPa·s to about 5000 mPa·s. The preferred range is dependent on the method of gas entrapment.

The bubble size of the wet foam is dependent on all the above parameters, in particular the viscosity, the amount of additives, the amount of particles and the apparatus or the apparatus dependent method parameters used to get air into the suspension. The bubble size, e.g. diameter, may range from 1 μm to 1 mm, preferably from 1 μm to 500 μm. The bubbles ultimately provide the cells in the catalyst precursor.

The wet foams may be cast into moulds for shaping or may be shaped by extrusion using conventional extrusion equipment suitably adjusted for the wet foam viscosity. The cast or extruded foams may then be subjected to a drying step to create a solid foam with sufficient green strength for further processing.

The drying can be carried out using a conventional oven at up to about 120° C. The drying time may be varied from 0.1-48 hours as desired to preserve the foam structure. The drying may be done at atmospheric or reduced pressure. At reduced pressure the foam may expand before the green strength is developed. The degree of expansion and hence the cell size of the foam will depend on the pressure selected. Drying at elevated temperature may also cause a slight expansion of the foam. It is preferred to control the humidity during the drying step, to prevent uneven shrinkage and drying cracks. Temperature-assisted or vacuum-assisted unidirectional drying leads to an even shrinkage of the sample without inducing stresses which would result in cracks. Freeze drying may also be used.

The suspension may include other ingredients, which play a role at the drying stage. Examples of such ingredients include binders such as resins, e.g. polyvinylchloride, gums, cellulose, starch, polyvinyl alcohol, oligo- and poly-saccharides to increase green strength. Polymerisable materials may also be included although this is less preferred. Although the addition of binders in general is not needed to produce suitable wet foams, such additives may have advantages if high green strength after drying is desired. The body formed in the presence of binders or polymerizable materials after drying is relatively robust, and the addition of binders or polymerizable materials can be preferred when the article to be formed is of a complex shape.

The cast or extruded foams may be subjected to additional shaping steps, including for example milling or grinding the ceramic foam to a desired particle size, sieving, granulating pelleting and other shaping procedures known in the art.

The foam may be subjected to a heating step or calcination in which the ceramic particles are fused together to form a porous catalyst support material. Such heating may be done at temperatures in the range 500-1600° C. or higher depending on the ceramic, although to retain a suitable pore structure in the cell walls, it may be desirable to calcine the ceramic foams below about 1200° C. The calcination may be performed for 1-24 hours, preferably 1-8 hours, depending on the temperature chosen. The heating step may be performed under air or an inert atmosphere such as nitrogen or argon. The latter may be preferred where decomposition of organic residues is expected.

The invention includes the step of applying cobalt oxide, or a precursor thereof, to the ceramic foam. This may be accomplished by applying a wash-coat slurry containing cobalt oxide, but this is less preferred because the foam comprises a closed cell structure and so the cobalt will not be able to penetrate the foam beyond the surface cells. Therefore preferably the catalyst precursor is prepared using one or more soluble cobalt compounds in solution. The cobalt compound may be an organic cobalt compounds such as cobalt acetylacetonate, a cobalt complex such as cobalt amine carbonate, or may be a cobalt salt such as cobalt acetate and/or cobalt nitrate. One or more soluble cobalt compounds may be used. Thus in a preferred method, a soluble cobalt compound is dissolved in a suitable solvent, such as water, to form a cobalt solution and the cobalt solution applied to the ceramic foam, e.g. by spraying or dipping, to impregnate the cells and cell wall pores. In addition to soluble cobalt compounds, one or more soluble promoter compounds may be included in the cobalt solution or may be applied to the foam in a separate impregnation step. Soluble compounds of Pt, Pd, Ru and Re are preferred.

The impregnated ceramic foam may then be subjected to drying to remove the solvent and leave the cobalt deposited within the foam. The cobalt may be deposited as a salt or complex or may be cobalt oxide depending upon the method used to impregnate the ceramic foam. The cobalt and any promoters are preferably uniformly deposited within the ceramic foam. A particularly suitable method for depositing cobalt uses a cobalt amine carbonate complex, which upon oxidation and heating deposits cobalt oxide directly within the cells and pores of the ceramic foam.

The cobalt compounds may if desired be subjected to a heating step or calcination to cause their decomposition to form cobalt oxide. This may accompany the drying step, or the calcination step may be performed separately. The conversion of cobalt compounds to cobalt oxide may conveniently be accomplished by heating the impregnated or dried cobalt-containing ceramic foam to temperatures up to about 800° C., preferably 200-800° C., more preferably 200-600° C., most preferably 200-400° C. under air or an inert gas such as nitrogen or argon. The calcination of the cobalt compounds may be performed over 0.5-8 hours depending on the temperature.

The catalyst precursor, where the cobalt is in oxidic form, may be provided for use in a Fischer-Tropsch process. Before use, the catalyst precursor is activated to produce a catalyst suitable for the Fischer-Tropsch reaction by reducing the cobalt oxide in the catalyst precursor to cobalt metal.

Alternatively the catalyst precursor may be pre-reduced and encapsulated to provide a catalyst product for use in the Fischer Tropsch process.

Reduction may be performed by passing a hydrogen-containing gas such as hydrogen, synthesis gas or a mixture of hydrogen with nitrogen, methane or other inert gas over the catalyst precursor at elevated temperature, for example by passing the hydrogen-containing gas over the composition at temperatures in the range 150-600° C., preferably 250-600° C., preferably 275-500° C. for between 1 and 24 hours. Reduction may be performed at atmospheric or higher pressures up to about 25 bar abs.

Catalysts in the reduced state can be difficult to handle as they can react spontaneously with oxygen in air, which can lead to undesirable self-heating and loss of activity. For catalysts suitable for Fischer-Tropsch processes, the reduced catalyst is preferably protected by encapsulation of the reduced catalyst particles with a suitable barrier coating. In the case of a Fischer-Tropsch catalyst, this may suitably be a FT-hydrocarbon wax. Alternatively, the catalyst can be provided in the unreduced state and reduced in-situ with a hydrogen-containing gas.

Cobalt catalysts prepared on the ceramic foam supports may have cobalt surface areas (as determined by hydrogen chemisorption at 150° C. following reduction at 425° C.) of ≥1 $m^2$/g catalyst. The cobalt surface area may suitably be determined by $H_2$ chemisorption. The preferred method is as follows; approximately 0.2 to 0.5 g of sample material is firstly degassed and dried by heating to 140° C. at 10° C./min in flowing helium and holding it at 140° C. for 60 mins. The degassed and dried sample is then reduced by heating it from 140° C. to 425° C. at a rate of 3° C./min under a 50 ml/min flow of hydrogen and then holding it under the same hydrogen flow, at 425° C. for 6 hours. Following reduction and under vacuum, the sample is heated up to 450° C. at 10° C./min and held under these conditions for 2 hours. The sample is then cooled to 150° C. and held for a further 30 minutes under vacuum. The chemisorption analysis is carried out at 150° C. using pure hydrogen gas. An automatic analysis program is used to measure a full isotherm over the range 100 mmHg up to 760 mmHg pressure of hydrogen. The analysis is carried out twice; the first measures the "total" hydrogen uptake (i.e. includes chemisorbed hydrogen and physisorbed hydrogen) and immediately following the first analysis the sample is put under vacuum (<5 mm Hg) for 30 mins. The analysis is then repeated to measure the physisorbed uptake. A linear regression may then be applied to the "total" uptake data with extrapolation back to zero pressure to calculate the volume of gas chemisorbed (V).

Cobalt surface areas were calculated in all cases using the following equation;

$$\text{Co surface area} = (6.023 \times 10^{23} \times V \times SF \times A)/22414$$

where V=uptake of $H_2$ in ml/g

SF=Stoichiometry factor (assumed 2 for $H_2$ chemisorption on Co)

A=area occupied by one atom of cobalt (assumed 0.0662 $nm^2$)

This equation is described in the Operators Manual for the Micromeretics ASAP 2010 Chemi System V 2.01, Appendix C, Part No. 201-42808-01, October 1996.

The catalysts may be used for the Fischer-Tropsch synthesis of hydrocarbons. Accordingly, the invention further provides a process for the Fischer-Tropsch synthesis of hydrocarbons comprising contacting a gas mixture containing hydrogen and carbon monoxide over a cobalt-catalyst comprising a ceramic foam support comprising a closed cell structure The Fischer-Tropsch synthesis of hydrocarbons with cobalt catalysts is well established. The Fischer-Tropsch synthesis converts a mixture of carbon monoxide and hydrogen to hydrocarbons. The mixture of carbon monoxide and hydrogen is typically a synthesis gas having a hydrogen: carbon monoxide ratio in the range 1.6-3.0:1, preferably 1.7-2.5:1. The reaction may be performed in a continuous or batch process using one or more fixed bed reactors, stirred slurry-phase reactors, jet-loop reactors, bubble-column reactors, or fluidised bed reactors. The process may be operated at pressures in the range 0.1-10 Mpa and temperatures in the range 150-350° C., preferably 200-250° C. The gas-hourly-space velocity (GHSV) for continuous operation is in the range 100-25000 $hr^{-1}$. A preferred operating range is 1000-15000 $hr^{-1}$.

The catalysts of the present invention are able to provide exceptionally high selectivity to the desired C5+ hydrocarbons, for example C5+ selectivity for titania-foam-supported FT catalysts maybe over 90%.

The invention will now be further described by reference to the following examples.

EXAMPLE 1 TITANIA FOAM PREPARATION a) A ceramic foam was prepared using a titania suspension containing 30% wt solids.

128 g titania powder (P25 available from Evonik) were added slowly to 300 ml demineralised water in a stirred vessel. Then, without pH adjustment, 0.36 mmol DL-phenylalanine were added per gram of titania (7.6 g DL-phenylalanine). The pH of the suspension was 4.59. Air was then introduced into the suspension to form bubbles using a gas inducing impeller for 30 minutes. The foam was cast into a tray and dried at room temperature and at atmospheric pressure. It was then calcined with a nitrogen purge by heating at 2° C./min to 600° C. After 45 minutes at 600° C. the nitrogen flow was replaced by air. The total dwell at 600° C. was 4 hours. The resulting ceramic foam support was crushed and sieved to 0.5 mm.

A porosity measurement was made by immersing the ceramic foam in demineralised water at room temperature for 4 days and measuring the water up-take by the increase in weight. The porosity measured in this way includes the volume of the cells and accessible pores and indicates the volume of cobalt solution that may be used to prepare the catalyst. The porosity of the foamed titania was 0.8 $cm^3/g$ after 4 days.

b) The method was repeated for different titania contents in the suspension as follows;

| Titania weight % | DL-phenylalanine mmol/g titania | pH | Porosity $cm^{-3}g^{-1}$ |
|---|---|---|---|
| 17.5 | 0.82 | 4.65 | 2.2 |
| 20.0 | 0.36 | 4.50 | 1.6 |
| 20.0 | 0.54 | 4.52 | 1.5 |
| 20.0 | 0.72 | 4.56 | 1.4 |
| 25.0 | 0.39 | 4.56 | 0.9 |
| 25.0 | 0.54 | 4.58 | 1.0 | c) The method was repeated, replacing the phenyl alanine with n-butyric acid. pH adjustment was required before air entrainment using potassium hydroxide.

| Titania weight % | Butyric Acid mmol/g titania | pH after butyric acid addition | Foaming | pH after KOH addition | Porosity $cm^3g^{-1}$ |
|---|---|---|---|---|---|
| 20 | 0.36 | 3.86 | Not Observed | 4.65 | 2.3 |
| 20 | 0.54 | 3.71 | — | 4.65 | 2.2 |
| 20 | 0.72 | 3.66 | — | 4.40 | 1.8 |
| 25 | 0.36 | 3.71 | — | 4.50 | 1.8 |
| 25 | 0.54 | 3.68 | — | 4.50 | 1.5 |
| 25 | 0.72 | 3.56 | — | 4.00 | 1.4 |
| 30 | 0.36 | 3.66 | — | 4.30 | 1.2 |
| 30 | 0.54 | 3.60 | — | 4.30 | 1.4 |
| 30 | 0.72 | 2.46 | — | 3.20* | 1.1 |

*pH was not increased further since an increase in viscosity was observed d) The method was repeated, replacing the phenylalanine with other alpha-amino acids. Unless otherwise indicated, no pH adjustment was performed prior to air entrainment.

| Example | Titania weight % | DL-amino acid mmol/g titania | pH | Porosity $cm^{-3}g^{-1}$ |
|---|---|---|---|---|
| 1(d)(i) | 30 | 0.21 DL-leucine | 3.66 | 0.62 |
| 1(d)(ii) | 30 | 0.54 DL-valine | 4.02 | 0.47 |
| 1(d)(iii) | 30 | 0.43 DL-phenyl alanine | 1.60* | 0.45 |
| 1(d)(iv) | 25 | 0.36 DL-Leucine | 0.93* | 0.52 |
| 1(d)(v) | 20 | 0.22 DL-tryptophan | 3.25 | 0.50 |
| 1(d)(vi) | 20 | 0.74 DL-leucine | 3.96 | 2.84 |
| 1(d)(vii) | 25 | 0.72 DL-isoleucine | 1.28* | 0.63 |
| 1(d)(viii) | 25 | 0.72 DL-methionine | 1.21* | 0.44 |

*pH adjusted by addition of nitric acid

EXAMPLE 2: CATALYST PRECURSOR PREPARATION a) Cobalt Nitrate Impregnation of Titania Foam of Example 1(a).

7 g of cobalt nitrate hexahydrate ($Co(NO_3)_2.6H_2O$) and 2.2 ml demineralised water were heated until the melting and dissolution of the salt were complete. This was added in aliquots to 15 g of the ceramic foam product of Example 1(a) in a plastic bag. After each addition the material was kneaded into the support. The impregnated foam was dried for 2 hours at 105° C. and calcined for 2 hours at 300° C. The process was then repeated. 5.5 g $Co(NO_3)_2.6H_2O$ and 2.74 ml demineralised water were heated until the melting and dissolution of the salt were complete. This was added in aliquots to 16.5 g of the impregnated ceramic foam product from the first impregnation in a plastic bag. After each addition the material was kneaded into the support. The resulting material was dried for 2 hours at 105° C. and calcined for 2 hours at 300° C. The cobalt content of the catalyst precursor by ICPAES was 10.8% wt. The cobalt surface area as determined by hydrogen chemisorption was 1.0 m²/g catalyst.

b) Cobalt Amine-Carbonate Impregnation of Titania Foam of Example 1(a).

A cobalt amine carbonate solution was prepared as follows; 198 ml of a 28% ammonia solution was added to 20.4 g ammonium carbonate in a round bottomed flask and diluted with 193.4 ml demineralised water. The resulting solution was stirred for 20 minutes then 23.7 g of cobalt basic carbonate was added over 15 minutes and the solution stirred at 150 rpm for a further 2.5 hr to give a purple solution. 30% hydrogen peroxide solution was added drop wise while the solution was stirred at 234 rpm until the Oxido-reduction potential (Metler Toledo transmitter M 700) was near to −100 mV. Stirring was continued for a further 10 minutes and then the solution was filtered.

385 ml of the Co amine carbonate solution (2.6% w/w Co) was added to a 2 L four-necked round bottom flask. A stirrer, temperature probe, lute and condenser were fitted to the flask. 52 g of the ceramic foam product of Example 1(a) was added. This mixture was then diluted with 385 mL water and 165 mL ammonia before being heated and agitated for 80 minutes to cause evolution of the ammonia and deposition of cobalt oxide in the cells and pores of the ceramic foam. The mixture was filtered and washed with 80 ml demineralised water. The catalyst precursor was dried at 105° C. for 8 hours. It was not calcined. The cobalt content of the catalyst precursor by ICPAES was 11.2% wt. The cobalt surface area as determined by hydrogen chemisorption was 1.1 m²/g catalyst.

c) Cobalt Amine-Carbonate Impregnation of Titania Foams of Examples 1(d) (i)-(iv).

The method of Example 2(b) was repeated using instead the titania foams obtained in Examples 1(d) (i)-(iv). The target cobalt content in each case was 13% by weight. The cobalt surface areas for the catalyst precursors, as determined by hydrogen chemisorption, are set out below.

| Foam | Cobalt Surface Area (m²/g catalyst) |
|---|---|
| 1(d)(i) | 3.9 |
| 1(d)(ii) | 1.6 |
| 1(d)(iii) | 1.5 |
| 1(d)(iv) | 1.5 |

EXAMPLE 3 CATALYST TESTING 0.5 g of the catalyst from Example 2(a) was tested for catalytic performance in Fischer-Tropsch synthesis. The reaction conditions were syngas ($H_2$:CO of 2:1) flow rate 30 ml$_N$/min, 20 bar and 210° C. with GHSV 3590 ml$_N$ sygas·g catalyst$^{-1}$·h$^{-1}$ and a target conversion of 50%. The selectivity to C5+ was 92%.

0.25 g of the catalyst from Example 2(b) was tested for catalytic performance in Fischer-Tropsch synthesis. The reaction conditions were syngas ($H_2$:CO 2:1) flow rate 44 ml$_N$/min, 20 bar and 210° C. with GHSV 10338 ml$_N$ sygas·g catalyst$^{-1}$·h$^{-1}$ and a target conversion of 50%. The selectivity to C5+ was 91%.

0.25 g of each of the catalysts from Example 2(c) was tested for catalytic performance in Fischer-Tropsch synthesis. The reaction conditions were syngas ($H_2$:CO of 2:1), 20 bar and 210° C. and a target conversion of 50%. The remaining reaction conditions and selectivity to C5+ for the catalysts based on the different foam materials were as follows;

| Foam | Flow Rate (ml$_N$/min) | Pressure (bar) | Temperature (° C.) | GHSV (ml$_N$ syngas · g catalyst$^{-1}$ · h$^{-1}$) | Selectivity to C5+ |
|---|---|---|---|---|---|
| 1(d)(i) | 49.48 | 20 | 210 | 12082 | 89.51 |
| 1(d)(ii) | 33.98 | 20 | 210 | 7816 | 89.90 |
| 1(d)(iii) | 15.20 | 20 | 210 | 3461 | 86.71 |
| 1(d)(iv) | 15.13 | 20 | 210 | 3642 | 90.02 |

The invention claimed is:

1. A method for preparing a catalyst precursor comprising cobalt oxide supported on a porous support that is a ceramic foam comprising cells in a closed cell structure, the method comprising the steps of:
   (i) forming the ceramic foam comprising the closed cell structure,
   (ii) applying a cobalt compound to the ceramic foam to form a cobalt-containing foamed metal oxide and
   (iii) heating the cobalt-containing foamed metal oxide to form the catalyst precursor, wherein the ceramic foam has a cell fraction in the range of from 50 to 95 vol % relative to the volume of the ceramic foam.

2. The method of claim 1, wherein the cobalt content of the catalyst precursor, expressed as Co, is in the range of 5-50% by weight.

3. The method of claim 1, wherein up to 20% by volume of the cell volume is interconnected.

4. The method of claim 1, wherein the closed cell structure comprises cells having an average cell diameter in a size range of from 10 to 150 μm.

5. The method of claim 1, wherein the ceramic foam contains cells having cells wall, where the cell wall thicknesses is up to 500 μm with an average cell wall thickness in the range of 10-100 μm.

6. The method of claim 1, wherein the ceramic foam comprises titania.

7. The method of claim 1 wherein the ceramic foam is formed by steps comprising:
   (a) forming a suspension of a ceramic powder in a liquid,
   (b) adding a gas to the liquid to create a wet foam, and
   (c) heating the wet foam to form the ceramic foam.

8. The method of claim 7, wherein the ceramic powder particle size in the suspension is in the range of 1 nm to 20 μm.

9. The method of claim 7, wherein the suspension contains one or more amphiphiles that act with the ceramic powder to stabilise the wet foam.

10. The method of claim 9, wherein the amphiphiles comprise one or more C2-C6 carboxylic acids or esters thereof, C2-C6 gallate esters, or alpha amino acids.

11. The method of claim 9, wherein the amphiphile comprises one or more of valine, isoleucine, leucine, phenylalanine or tryptophan.

12. The method of claim 7, wherein the wet foam is shaped before heating.

13. The method of claim 12, wherein the shaped foam is subjected to a heating step at a temperature in the range of 500-1600° C.

14. The method of claim 1, wherein the cobalt compound is an organic cobalt compound, a cobalt complex or a cobalt salt.

15. A method for preparing a catalyst comprising cobalt in elemental form supported on a porous support, wherein the porous support is a ceramic foam comprising a closed cell structure, wherein the ceramic foam has a cell fraction in the range of from 50 to 95 vol % relative to the volume of the ceramic foam, the method comprising applying a reducing gas stream to a Fisher Tropsch reaction catalyst precursor comprising cobalt oxide supported on a porous support that is titania comprising a closed cell structure; wherein at least a portion of the cobalt oxide is converted to elemental form.

\* \* \* \* \*